US012617406B2

(12) United States Patent
Ozawa et al.

(10) Patent No.: US 12,617,406 B2
(45) Date of Patent: May 5, 2026

(54) TRAVEL CONTROL DEVICE, TRAVEL CONTROL METHOD, AND STORAGE MEDIUM STORING TRAVEL CONTROL PROGRAM

(71) Applicant: J-QuAD DYNAMICS Inc., Tokyo (JP)

(72) Inventors: Yuuki Ozawa, Tokyo (JP); Riku Koyama, Tokyo (JP)

(73) Assignee: J-QuAD DYNAMICS Inc., Tokyo (JP)

( * ) Notice: Subject to any disclaimer, the term of this patent is extended or adjusted under 35 U.S.C. 154(b) by 89 days.

(21) Appl. No.: 18/647,239

(22) Filed: Apr. 26, 2024

(65) Prior Publication Data

US 2024/0270256 A1     Aug. 15, 2024

Related U.S. Application Data

(63) Continuation of application No. PCT/JP2022/039580, filed on Oct. 24, 2022.

(30) Foreign Application Priority Data

Oct. 29, 2021     (JP) ................................. 2021-177588

(51) Int. Cl.
*B60W 30/182* (2020.01)
*B60W 30/14* (2006.01)
*B60W 30/16* (2020.01)
*B60W 30/18* (2012.01)

(52) U.S. Cl.
CPC ........ *B60W 30/182* (2013.01); *B60W 30/143* (2013.01); *B60W 30/16* (2013.01); *B60W*

*30/18072* (2013.01); *B60W 2552/15* (2020.02); *B60W 2554/802* (2020.02)

(58) Field of Classification Search
None
See application file for complete search history.

(56) References Cited

U.S. PATENT DOCUMENTS

2017/0198655 A1* 7/2017 Roos ..................... B60W 10/06
2017/0355369 A1* 12/2017 La ....................... B60W 30/143
(Continued)

FOREIGN PATENT DOCUMENTS

| CN | 109774473 A | * | 5/2019 |
|----|-------------|---|--------|
| JP | 2016017515 A | | 2/2016 |
| JP | 2016117368 A | | 6/2016 |

(Continued)

*Primary Examiner* — David P. Merlino
(74) *Attorney, Agent, or Firm* — Harness, Dickey & Pierce, P.L.C.

(57)     ABSTRACT

A travel control device is configured to execute: a coasting travel process; a cruise travel process, a gradient information acquisition process acquiring, as gradient information, information indicating a gradient of a road surface on which a vehicle is traveling; a deviation variable acquisition process acquiring a deviation variable for determining an acceleration generated in the vehicle when the vehicle travels, by performing the coasting travel process, a downward slope having a predetermined gradient; and a switching process using the gradient information and the deviation variable as inputs and performing switching to the coasting travel process according to a value of the deviation variable even though a magnitude of the gradient of the road surface is different from a reference value.

6 Claims, 7 Drawing Sheets

(56) References Cited

U.S. PATENT DOCUMENTS

2018/0120841 A1* 5/2018 Endo ................... B60W 50/082
2023/0069732 A1* 3/2023 Aggoune ............. B60W 50/14

FOREIGN PATENT DOCUMENTS

JP        2017094981 A      6/2017
JP        2017150422 A      8/2017
JP        2018034597 A      3/2018

* cited by examiner

FIG. 2

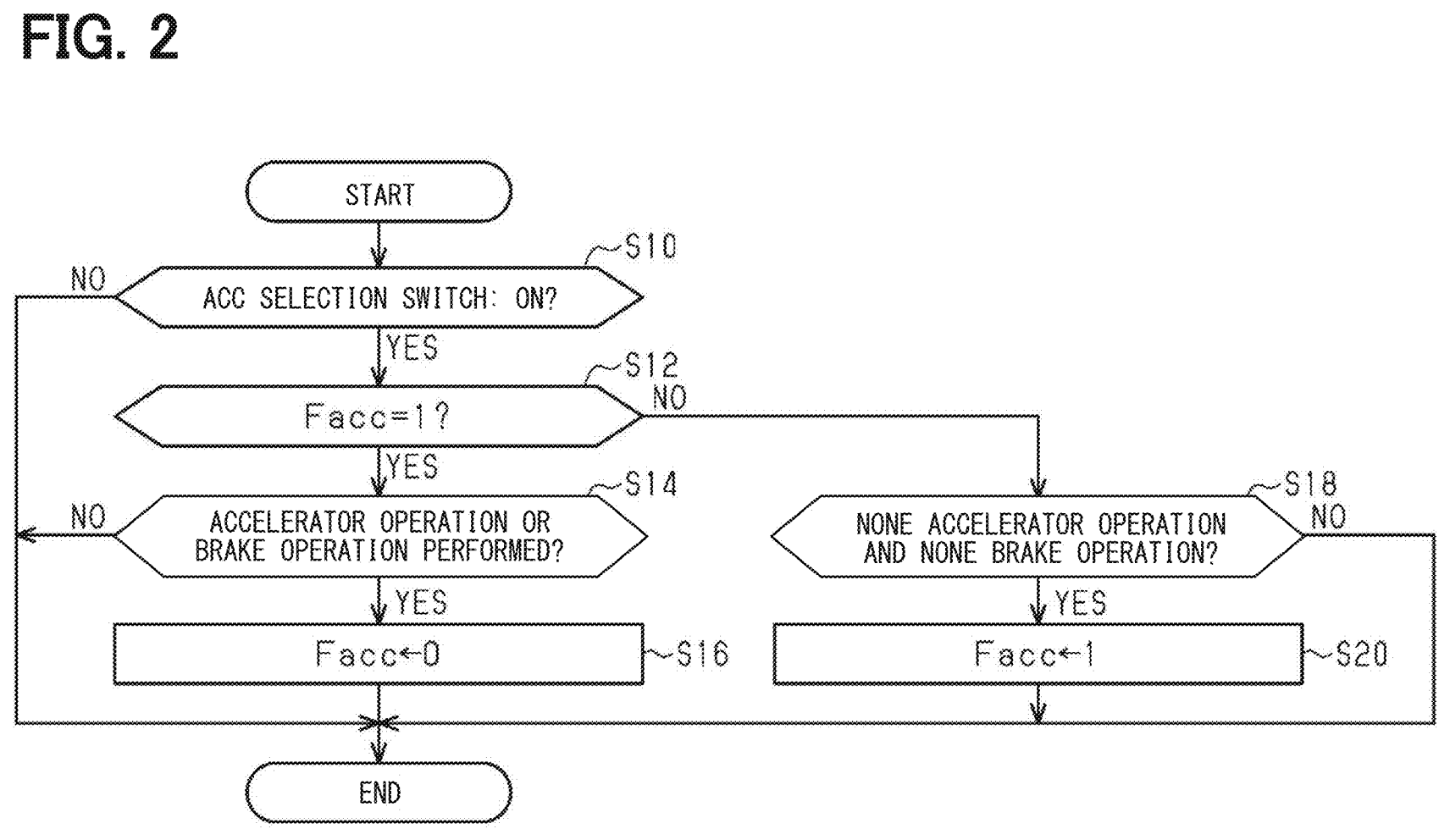

```
           START
             │
             ▼
     ┌─────────────────┐
     │ ACC SELECTION    │  S10
  ◄──┤ SWITCH: ON?      │
  NO └─────────────────┘
             │ YES
             ▼
     ┌─────────────────┐  S12
     │ Facc=1?          │─── NO ──┐
     └─────────────────┘          │
             │ YES                │
             ▼                    ▼
     ┌─────────────────┐  S14   ┌──────────────────────┐  S18
     │ ACCELERATOR      │       │ NONE ACCELERATOR     │── NO ──┐
  ◄──┤ OPERATION OR     │       │ OPERATION AND NONE   │        │
  NO │ BRAKE OPERATION  │       │ BRAKE OPERATION?     │        │
     │ PERFORMED?       │       └──────────────────────┘        │
     └─────────────────┘          │ YES                        │
             │ YES                ▼                             │
             ▼              ┌──────────┐  S20                   │
     ┌──────────┐  S16      │ Facc←1   │───────────────────────┘
     │ Facc←0   │           └──────────┘
     └──────────┘
             │
             ▼
           END
```

CRUISE TRAVEL MODE

VC (1)

$\theta$ $\theta < \theta 1$ $\theta > \theta 2$

COASTING TRAVEL MODE

VC (1)

$\theta$ $\theta < \theta 1$ $\theta > \theta 2$

TRAVEL CONTROL DEVICE, TRAVEL CONTROL METHOD, AND STORAGE MEDIUM STORING TRAVEL CONTROL PROGRAM

CROSS REFERENCE TO RELATED APPLICATIONS

The present application is a continuation application of International Patent Application No. PCT/JP2022/039580 filed on Oct. 24, 2022, which designated the U.S. and claims the benefit of priority from Japanese Patent Application No. 2021-177588 filed on Oct. 29, 2021. The entire disclosures of all of the above applications are incorporated herein by reference.

TECHNICAL FIELD

The present disclosure relates to a travel control device, a travel control method, and a storage medium storing a travel control program.

BACKGROUND

A known travel control device switches a travel mode of a vehicle to coasting travel during cruise control. The travel control device determines a switch time to coasting travel and a time to end the coasting travel in accordance with an inter-vehicle time, which is the time required for a host vehicle to travel a distance between the host vehicle and a preceding vehicle.

SUMMARY

A travel control device is configured to perform: a coasting travel process; a cruise travel process; a gradient information acquisition process; a deviation variable acquisition process; and a switching process. The coasting travel process performs a coasting travel of a vehicle. The cruise travel process controls a speed of the vehicle to a set vehicle speed while giving a priority to satisfaction of a predetermined condition. The predetermined condition is a condition for maintaining a distance to a preceding vehicle within a predetermined distance range when the preceding vehicle is located within a predetermined range ahead of the vehicle. The gradient information acquisition process acquires, as gradient information, information indicating a gradient of a road surface on which the vehicle is traveling. The deviation variable acquisition process acquires, separately from the gradient information, a deviation variable for determining an acceleration generated in the vehicle when the vehicle travels, by performing the coasting travel process, a downward slope having a predetermined gradient. The switching process uses the gradient information and the deviation variable as inputs and performs switching to the coasting travel process when the vehicle travels the downward slope while the cruise travel process is being executed, the switching process performs switching to the coasting travel process according to a value of the deviation variable even though a magnitude of the gradient of the road surface is different from a reference value.

BRIEF DESCRIPTION OF DRAWINGS

The above and other objects, features and advantages of the present disclosure will become more apparent from the following detailed description made with reference to the accompanying drawings. In the drawings:

FIG. 2 is a flowchart showing a procedure of process executed by a control device according to the first embodiment;

FIG. 5A and FIG. 5B are diagrams showing examples in which switching is determined according to inside or outside of one-way tunnel;

DETAILED DESCRIPTION

Figure 1:
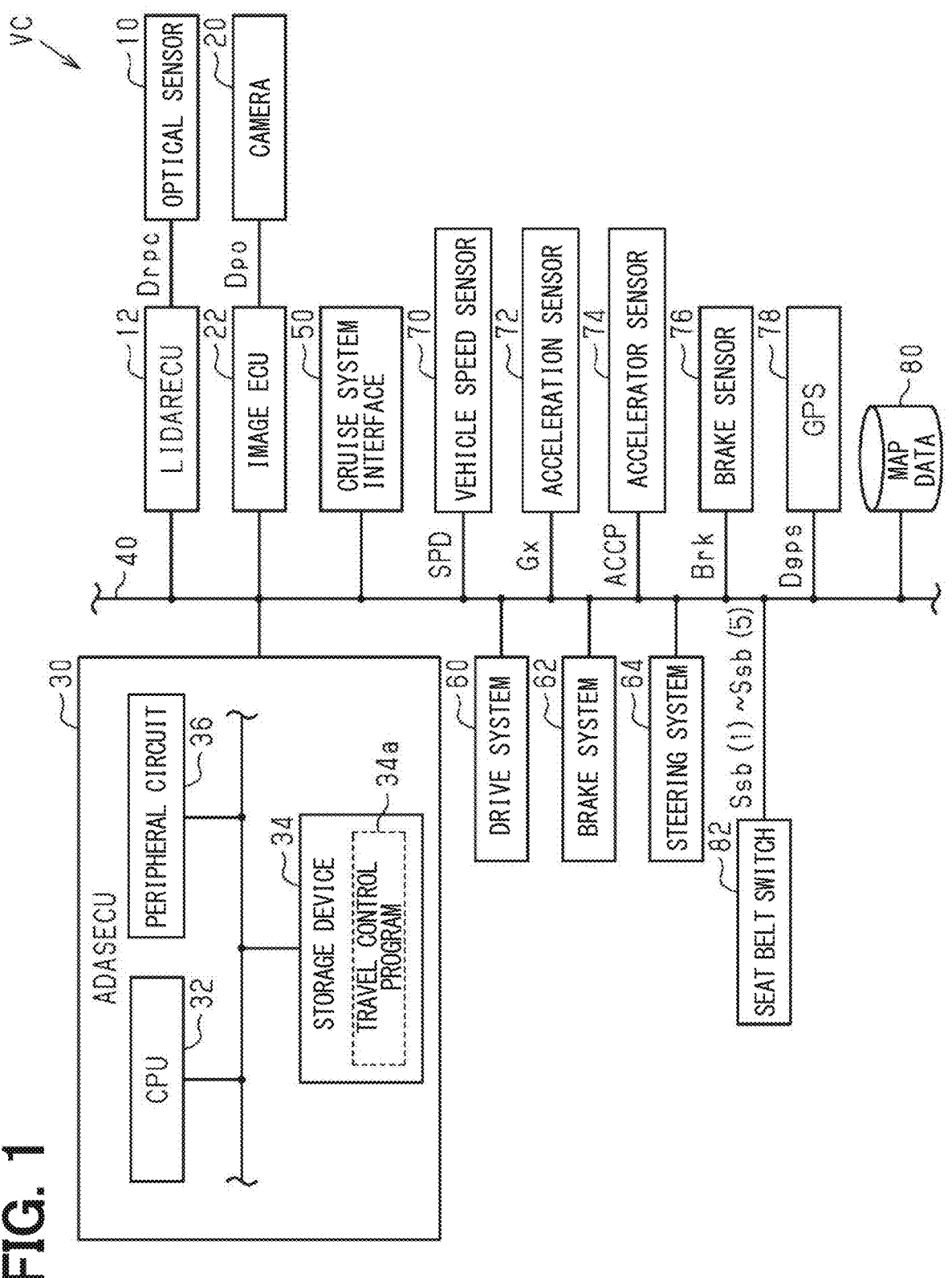
FIG. 1 is a diagram showing a configuration of a travel control system according to an embodiment.

The coasting travel is effective in reducing energy consumption rate of the vehicle. However, the above-mentioned device cannot sufficiently reduce the energy consumption rate when the vehicle is traveling a downward slope.

According to an aspect of the present disclosure, a travel control device includes a computer and a non-transitory storage device. The computer, by executing a control program stored in the non-transitory storage device, is configured to execute: a coasting travel process; a cruise travel process; a gradient information acquisition process; a deviation variable acquisition process; and a switching process. The coasting travel process performs a coasting travel of a vehicle. The cruise travel process controls a speed of the vehicle to a set vehicle speed while giving a priority to satisfaction of a predetermined condition. The predetermined condition is a condition for maintaining a distance to a preceding vehicle within a predetermined distance range when the preceding vehicle is located within a predetermined range ahead of the vehicle. The gradient information acquisition process acquires, as gradient information, information indicating a gradient of a road surface on which the vehicle is traveling. The deviation variable acquisition process acquires, separately from the gradient information, a deviation variable for determining an acceleration generated in the vehicle when the vehicle travels, by performing the coasting travel process, a downward slope having a predetermined gradient. The switching process uses the gradient information and the deviation variable as inputs and performs switching to the coasting travel process when the vehicle travels the downward slope while the cruise travel process is being executed, the switching process performs switching to the coasting travel process according to a value of the deviation variable even though a magnitude of the gradient of the road surface is different from a reference value.

The acceleration of vehicle during coasting travel on downward slope depends on the gradient of road surface. However, variables that affect the acceleration are not limited to the gradient of road surface. Therefore, when switching to coasting travel based only on the gradient information, the condition for coasting travel switch is controlling the vehicle speed and the vehicle distance within an appropriate range regardless of the influence of other variables. This configuration may cause a decrease in the frequency of switching to the coasting travel process. In the above configuration of the present disclosure, whether to switch to the coasting travel process is determined based on not only the gradient information of road surface but also the value of deviation variable. Therefore, it is possible to increase the opportunity of switching to the coasting travel process as much as possible while controlling the vehicle speed and the vehicle distance within an appropriate range.

First Embodiment

The following will describe a first embodiment of the present disclosure with reference to the accompanying drawings.

FIG. 1 shows a device mounted on a vehicle according to the present embodiment. As shown in FIG. 1, an optical sensor 10 emits laser light such as near-infrared light. The optical sensor 10 generates distance measurement point data by receiving the reflected laser light. The distance measurement point data indicates a distance variable. The distance variable indicates a distance between an object on which the laser light is reflected and the vehicle. The distance measurement point data indicates a direction variable. The direction variable indicates a direction in which the laser light is emitted. The distance measurement point data indicates an intensity variable. The intensity variable indicates a reflection intensity of reflection object on which the light is reflected. The distance measurement point data can be generated by, for example, TOF (Time of Flight) method. However, distance measurement point data may be generated using not only the TOF method, but also FMCW (Frequency Modulated Continuous Wave) method. In this case, the distance measurement point data can include a speed variable that indicates a relative speed of the vehicle with respect to the object on which the laser light is reflected.

The optical sensor 10 periodically scans an emit direction of the laser light in the horizontal and vertical directions, and outputs distance measurement point cloud data Drpc, which is a collection of the acquired distance measurement point data.

A LIDAR ECU 12 executes a recognition process of an object on which the laser light is reflected, based on the distance measurement point cloud data Drpc. The recognition process may be performed, for example, according to the following procedure. First, a clustering process is executed on the distance measurement point cloud data Drpc. Next, a feature amount of a set of distance measurement point data, which is identified as one object by clustering process, is extracted. Next, the extracted feature amount is input to an identification model that determines whether the object is a specified object. Instead of the above steps, the distance measurement point cloud data Drpc can be directly input to a deep learning model to recognize an object.

A camera 20 outputs image data Dpo indicating an outside of the vehicle VC. An image ECU 22 executes a process for recognizing objects around the vehicle based on the image data Dpo, which is data related to an image captured by the camera 20.

An ADAS ECU 30 executes a process for controlling a travel of the vehicle VC. When executing the process for controlling travel of the vehicle, the ADAS ECU 30 receives the recognition results from each of the LIDAR ECU 12 and the image ECU 22, via a local network 40. The ADAS ECU 30 executes cruise control and the like in response to an operation being input to a cruise system interface 50. The cruise system interface 50 is configured to receive an operation, such as an instruction related to execution of the cruise control, an instruction of a set vehicle speed SPD* in the cruise travel process. When executing the process for controlling the travel, the ADAS ECU 30 operates a drive system 60, a brake system 62, and a steering system 64.

The drive system 60 includes at least one of an internal combustion engine or a rotating electric machine, which correspond to travel force generation devices for the vehicle. The drive system 60 may include a drive control device that controls the internal combustion engine or the rotating electric machine. In that case, "the ADAS ECU 30 operates the drive system 60" means that the ADAS ECU 30 outputs a command signal to the drive control device.

The brake system 62 includes at least one of two devices: a device that decreases a rotation speed of the wheels by frictional force; and a device that decreases a rotation speed of the wheels by converting the driving power of the wheels into electric energy. The device that decreases the rotation speed of the wheels by converting the driving power into electric energy may be shared with the rotating electric machine of the drive system. The brake system 62 may include a brake control device that controls a device that decreases the rotation speed of the wheels. In that case, "the ADAS ECU 30 operates the brake system 62" means that the ADAS ECU 30 outputs a command signal to the brake control device.

The steering system 64 includes a steering actuator that rotates a steering wheel. The steering system 64 may include a steering control device that operates the steering actuator. In this case, "the ADAS ECU 30 operates the steering system 64" means that the ADAS ECU 30 outputs a command signal to the steering control device.

The ADAS ECU 30 refers to a vehicle speed SPD, which is detected by a vehicle speed sensor 70, and a longitudinal acceleration Gx of the vehicle VC, which is detected by an acceleration sensor 72. The ADAS ECU 30 also refers to an accelerator operation amount ACCP, which is a depression amount of an accelerator pedal and is detected by an accelerator sensor 74, and a brake operation amount Brk, which is a depression amount of a brake pedal and is detected by a brake sensor 76. The ADAS ECU 30 refers to position data Dgps of the Global Positioning System (GPS) 78 and map data 80. The ADAS ECU 30 refers to output signals Ssb(1) to Ssb(5) of a seat belt switch 82. The output signals Ssb(1) to Ssb(5) are turned on when the corresponding seat belt of each of the five seats is fastened, and are turned off when the corresponding seat belt is released.

The ADAS ECU 30 includes a CPU 32, a storage device 34, and a peripheral circuit 36. The peripheral circuit 36 includes a circuit that generates a clock signal for regulating the internal operation, a power supply circuit, a reset circuit, and the like. The ADAS ECU 30 executes a cruise control process and the like by, using the CPU 32, executing a travel control program 34a stored in the storage device 34.

In the present embodiment, when cruise control is instructed by an operation input to the cruise system interface 50, the CPU 32 executes a cruise travel process or a coasting travel process. The cruise travel process controls the vehicle speed SPD to a set vehicle speed SPD*. When a preceding vehicle is travelling within a predetermined range of the lane in which the host vehicle is traveling, the CPU 32 gives priority to a distance control process for maintaining the inter-vehicle distance to the preceding vehicle within a predetermined range. When there is no preceding vehicle within a predetermined range of the lane in which the vehicle is traveling, the CPU 32 executes a coasting travel process when a difference between the vehicle speed SPD and the set vehicle speed SPD* is equal to or less than a predetermined value. The CPU 32 may recognize the preceding vehicle based on the recognition results from the LIDAR ECU 12 and the image ECU 22, respectively.

In the coasting travel process, traveling force is not applied from the vehicle's traveling power generating device to the drive wheels of the vehicle. For example, when the drive system 60 includes an internal combustion engine and a transmission, as power generating devices, the coasting travel process may be a process of establishing a neutral state in which power transmission between the internal combustion engine and the drive wheels is disconnected. For example, when drive system 60 includes a rotating electric machine as a power generating device, the coasting travel process may be a process in which a torque command value for the rotating electric machine is set to zero. For example, when the drive system 60 includes an internal combustion engine and a rotating electric machine as power generating devices, it is not essential that the power generating device does not generate power during the coasting travel process. In this case, for example, the driving force of internal combustion engine may be converted into electric power generated by a rotating electric machine. Thus, a proportion of the driving force of the internal combustion engine that is transmitted to the drive wheels may become zero.

The following will describe processes executed by the ADAS ECU 30 in the order of "process related to determining of execution of cruise control" and "process related to switching between cruise travel process and coasting travel process".

(Process Related to Determining of Execution of Cruise Control)

FIG. 2 shows the process related to determining of execution of cruise control. The process shown in FIG. 2 is implemented by the CPU 32 by repeatedly executing the travel control program 34a, for example, at a predetermined interval. Hereinafter, the step number of each process is represented by a number prefixed with "S".

In the process shown in FIG. 2, the CPU 32 first determines whether an ACC selection switch of the cruise system interface 50 is in ON state (S10). The ACC selection switch is a switch that is turned on when cruise control is to be instructed. In response to determining that the switch is in the on state (S10: YES), the CPU 32 determines whether a cruise control flag Facc is set to "1" (S12). The cruise control flag Facc is set to "1" when either the cruise travel process or the coasting travel process is in execution state, and is set to "0" when neither process is in execution state. When the CPU 32 determines that the cruise control flag Facc is "0" (S12: NO), the CPU 32 determines whether both the accelerator pedal and the brake pedal are being operated (S18). This process determines whether a condition for executing the cruise control is satisfied. In the present embodiment, the condition for executing the cruise control is satisfied when a logical product of the ACC selection switch being in the on state and an override by the driver is not performed is true. The override is either the operation of the accelerator pedal or the operation of the brake pedal. In response to determining that neither of the accelerator pedal nor the brake pedal is operated (S18: YES), the CPU 32 sets the cruise control flag Facc to "1" (S20).

When the CPU 32 determines that the cruise control flag Facc is "1" (S12: YES), the CPU 32 further determines whether a logical sum of the operation of accelerator pedal and the operation of brake pedal is true (S14). This process determines whether an override is performed during execution state of cruise control. When the CPU 32 determines that the logical sum is true (S14: YES), the CPU sets the cruise control flag Face to "0" (S16).

It should be noted that the CPU 32 temporarily ends the process shown in FIG. 2 when the process in S16 or S20 is ended, or when a negative determination is made in S10, S14, and S18 of the process.

(Process Related to Switching Between Cruise Travel Process and Coasting Travel Process)

Figure 3:
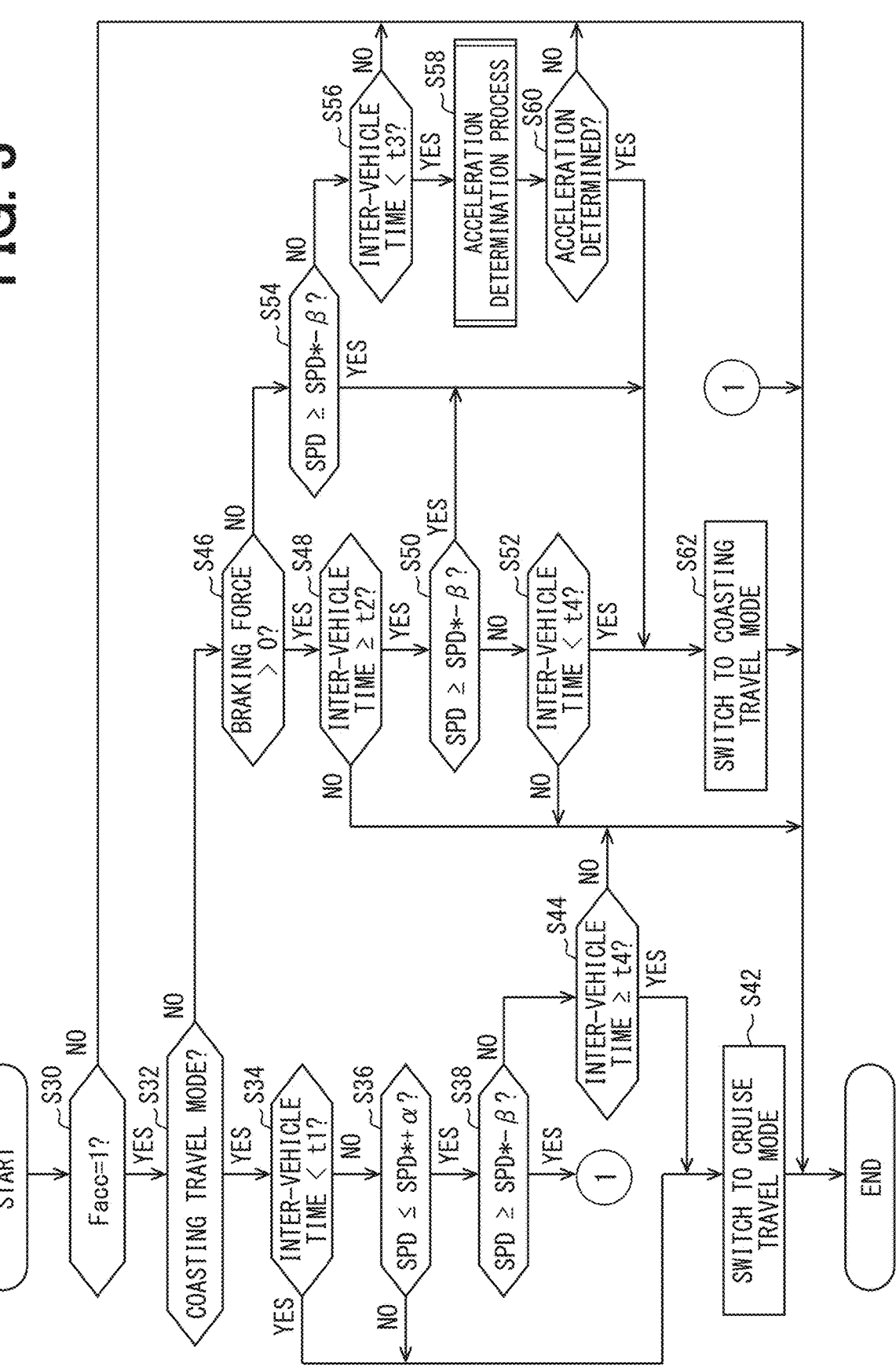
FIG. 3 is a flowchart showing a procedure of process executed by the control device according to the first embodiment.

FIG. 3 shows a procedure of switching process according to the inter-vehicle distance. The process shown in FIG. 3 is implemented by the CPU 32 by repeatedly executing the travel control program 34a, for example, at a predetermined interval.

In the process shown in FIG. 3, the CPU 32 first determines whether the cruise control flag Facc is "1" (S30). When the CPU 32 determines that the cruise control flag Facc is "1" (S30: YES), the CPU 32 further determines whether the vehicle is in a coasting travel mode (S32). When the CPU 32 determines that the vehicle is in the coasting travel mode (S32: YES), the CPU 32 determines whether the inter-vehicle time is less than a threshold value t1 (S34). The inter-vehicle time is a duration required for the host vehicle to reach the current position of the preceding vehicle in the current traveling lane of the host vehicle. The inter-vehicle time is calculated by the CPU 32 based on the vehicle speed SPD. In this process, the CPU determines whether a braking force should be applied to the host vehicle in order to allow the host vehicle to travel safely in a situation where a preceding vehicle travels in front of the host vehicle. The threshold value t1 is set to a vehicle-to-vehicle distance, which is short enough at a level where a braking force should be applied to the host vehicle.

In response to determining that the inter-vehicle time is equal to or greater than the threshold value t1 (S34: NO), the CPU 32 further determines whether the vehicle speed SPD is equal to or less than a value obtained by adding a predetermined amount α to the set vehicle speed SPD* (S36). The predetermined amount α is an upper limit value of the amount by which the vehicle speed SPD exceeds the set vehicle speed SPD* when the vehicle speed SPD is controlled in accordance with the set vehicle speed SPD*. When the CPU 32 determines that the vehicle speed SPD is equal to or lower than the value obtained by adding the predetermined amount α to the set vehicle speed SPD* (S36: YES), the CPU further determines whether the vehicle speed SPD is equal to or higher than a value obtained by subtracting a predetermined amount β from the set vehicle speed SPD* (S38). The predetermined amount β is a lower limit value of the amount by which the vehicle speed SPD falls below the set vehicle speed SPD* when the vehicle speed SPD is controlled in accordance with the set vehicle speed SPD*.

In response to determining that the vehicle speed SPD is less than the value obtained by subtracting the predetermined amount β from the set vehicle speed SPD* (S38: NO), the CPU 32 further determines whether the inter-vehicle time is equal to or greater than a threshold value t4 (S44). This process determines whether the distance to the preceding vehicle is excessively long. The threshold value t4 is set to a value greater than the threshold value t1. The preceding vehicle here is a target vehicle with respect to which the cruise travel process is executed. The target vehicle is a vehicle located within a predetermined range ahead of the host vehicle in the current traveling lane of the host vehicle. Therefore, vehicles located farther away than the predetermined range are not included in the target vehicles. If there is no preceding vehicle within the predetermined range, the CPU 32 makes a negative determination in S44.

When the CPU 32 makes a positive determination in S34, S44 or when the CPU 32 makes a negative determination in S36, the CPU 32 switches to the cruise travel mode (S42). In the coasting travel mode, the CPU 32 switches to the cruise travel mode in response to any one of the following conditions being satisfied.

Condition (A): The inter-vehicle time is less than the threshold value t1.

Condition (B): The amount by which the vehicle speed SPD exceeds the set vehicle speed SPD* exceeds the predetermined amount α.

Condition (C): A logical product of the condition of the amount by which the vehicle speed SPD falls below the set vehicle speed SPD* exceeding the predetermined amount β and the condition of the inter-vehicle time being equal to or greater than the threshold value t4 is true.

In response to determining that the vehicle is in the cruise travel mode (S32: NO), the CPU 32 determines whether the braking force is greater than zero (S46). In response to determining that the braking force is greater than zero (S46: YES), the CPU 32 determines whether the inter-vehicle time is equal to or greater than a threshold value t2 (S48). The threshold value t2 is set to a value that is greater than the threshold value t1 but smaller than the threshold value t4. This process determines whether the braking force of the vehicle can be reduced to allow the vehicle to perform coasting travel. In response to determining that the inter-vehicle time is equal to or greater than the threshold value t2 (S48: YES), the CPU 32 further determines whether vehicle speed SPD is equal to or greater than a value obtained by subtracting the predetermined amount β from the set vehicle speed SPD* (S50).

In response to determining that the vehicle speed is less than the value obtained by subtracting the predetermined amount β from the set vehicle speed (S50: NO), the CPU 32 further determines whether the inter-vehicle time is less than the threshold value t4 (S52). When the CPU 32 determines that the braking force is equal to or less than zero (S46: NO), the CPU 32 further determines whether the vehicle speed SPD is equal to or greater than a value obtained by subtracting the predetermined amount β from the set vehicle speed SPD* (S54). In response to determining that the vehicle speed is smaller than the value obtained by subtracting the predetermined amount β from the set vehicle speed (S54: NO), the CPU 32 further determines whether the inter-vehicle time is smaller than a threshold value t3 (S56). The threshold value t3 is a value greater than the threshold value t2 but smaller than the threshold value t4. When the CPU 32 determines that the inter-vehicle time is smaller than the threshold value t3 (S56: YES), the CPU 32 proceeds to a process of S58 (referred to as acceleration determination process in the drawing).

Figure 4:
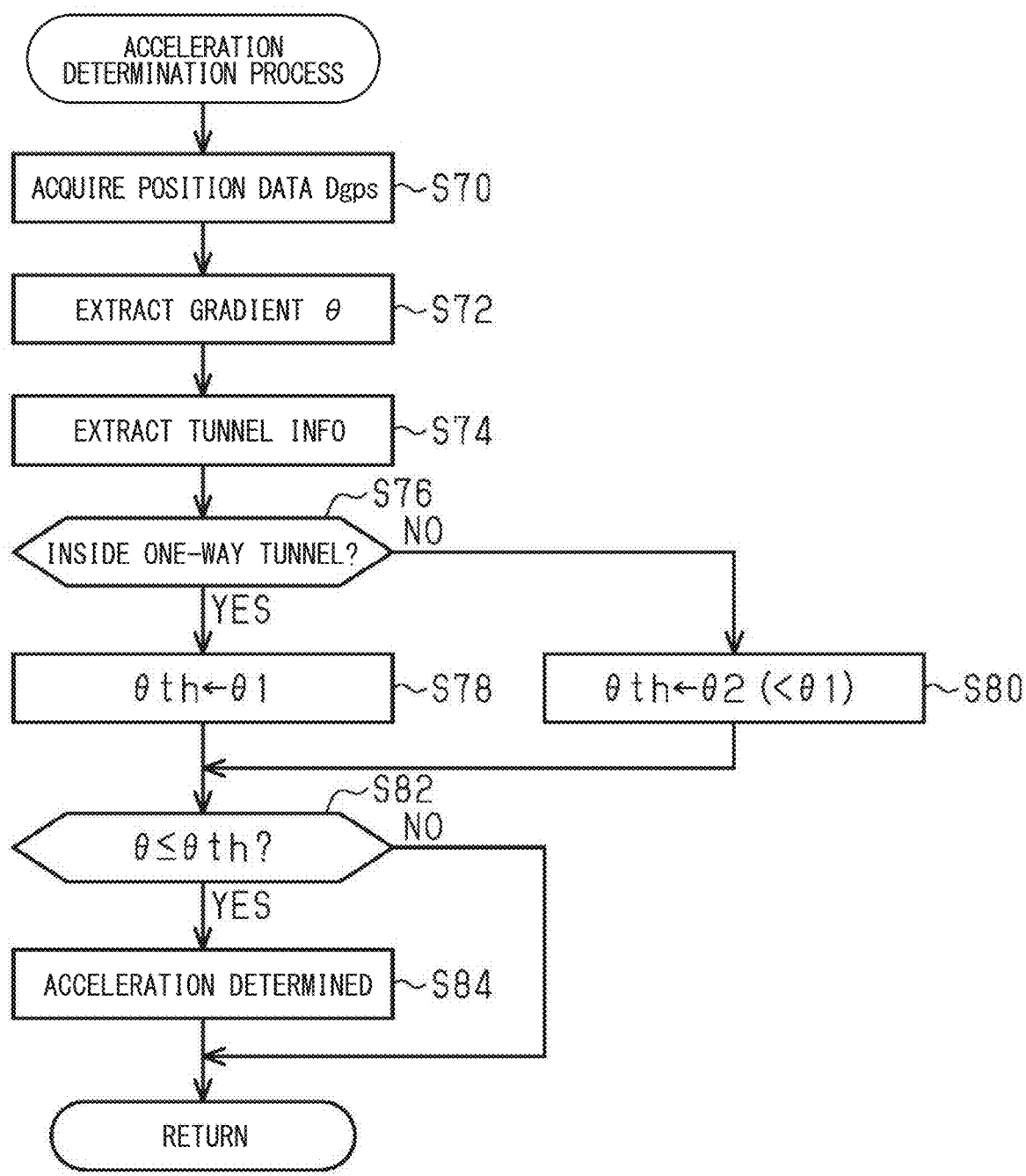
FIG. 4 is a flowchart showing a procedure of process executed by the control device according to the first embodiment.

FIG. 4 shows details of the process executed in S58.

In the series of processes shown in FIG. 4, the CPU 32 first acquires position data Dgps (S70). Then, the CPU 32 extracts, from the map data 80, a gradient θ of road surface on which the vehicle VC is currently traveling based on the position data Dgps (S72). The CPU 32 extracts, from the map data 80, a variable value indicating whether the vehicle VC is traveling inside a tunnel based on the position data Dgps (S74). Based on the result of process in S74, the CPU 32 determines whether the vehicle VC is currently traveling in a one-way tunnel (S76). When determining that the vehicle is traveling in a one-way tunnel (S76: YES), the CPU 32 assigns a tunnel threshold value θ1 to a threshold value θth (S78). The threshold value θth is a value to be compared with the gradient θ acquired in the process of S72. The threshold value θth is set to a value at which the vehicle VC accelerates by the coasting travel process. In the present embodiment, the gradient θ has a positive value in the case of an upward slope, and has a negative value in the case of downward slope.

When the CPU 32 determines that the vehicle is not traveling in a one-way tunnel (S76: NO), the CPU assigns a reference threshold value θ2 to the threshold value θth (S80). The reference threshold value θ2 is smaller than the tunnel threshold value θ1. The reference threshold value θ2 and the tunnel threshold value θ1 both have negative values, and the absolute value of the reference threshold value θ2 is greater than the absolute value of the tunnel threshold value θ1. After completing S78 and S80, the CPU 32 determines whether the gradient θ is equal to or less than the threshold value θth (S82). When the CPU 32 determines that the gradient θ is equal to or less than the threshold value θth (S82: YES), the CPU 32 makes an acceleration determination that the vehicle VC will accelerate by performing the coasting travel process (S84).

It should be noted that when the CPU 32 completes the process of S84 or when a negative determination is made in the process of S82, the CPU 32 temporarily completes the process of S58.

Returning to FIG. 3, the CPU 32 determines whether acceleration of vehicle is determined in the process of S58 (S60). When a positive determination is made in the processes of S52, S54, and S60, the CPU 32 switches to the coasting travel mode (S62). The CPU 32 switches the travel mode to the coasting travel mode when any one of the following conditions is satisfied during the cruising travel mode.

Condition (H): A logical product of the condition of the braking force being equal to or less than zero, the condition of the vehicle speed SPD being less than the value obtained by subtracting the predetermined amount β from the set vehicle speed SPD*, the condition of the inter-vehicle time being less than the threshold value t3, and the condition of the gradient θ being equal to or less than the threshold value θth is true. The threshold value t3 is set to be greater than the threshold value t2 and smaller than the threshold value t4.

Condition (I): A logical product of the condition of braking force being positive, the condition of vehicle speed SPD being less than the value obtained by subtracting the predetermined amount β from the set vehicle speed SPD*, and the condition of inter-vehicle time being equal to or greater than the threshold value t2 and less than threshold value t4 is true.

Condition (J): A logical product of the condition of braking force being equal to or less than zero and the condition of the vehicle speed SPD being equal to or greater than the value obtained by subtracting the predetermined amount β from the set vehicle speed SPD* is true.

The CPU 32 temporarily ends the process shown in FIG. 3 when the process of S42 and S62 is completed, when negative determination is made in each of the process of S30, S44, S48, S52, S56, and S60, or when a positive determination is made in the process of S38.

The following will describe operations and effects of the present embodiment.

When the CPU 32 is executing the cruise travel process, in response to the above condition (H) being satisfied, the CPU 32 switches to the coasting travel mode. When the vehicle VC is traveling inside a one-way tunnel, the CPU 32 switches to the coasting travel mode at a downward slope gradient having a smaller value compared with when the vehicle VC is traveling outside a tunnel.

Figures 5A, 5B:
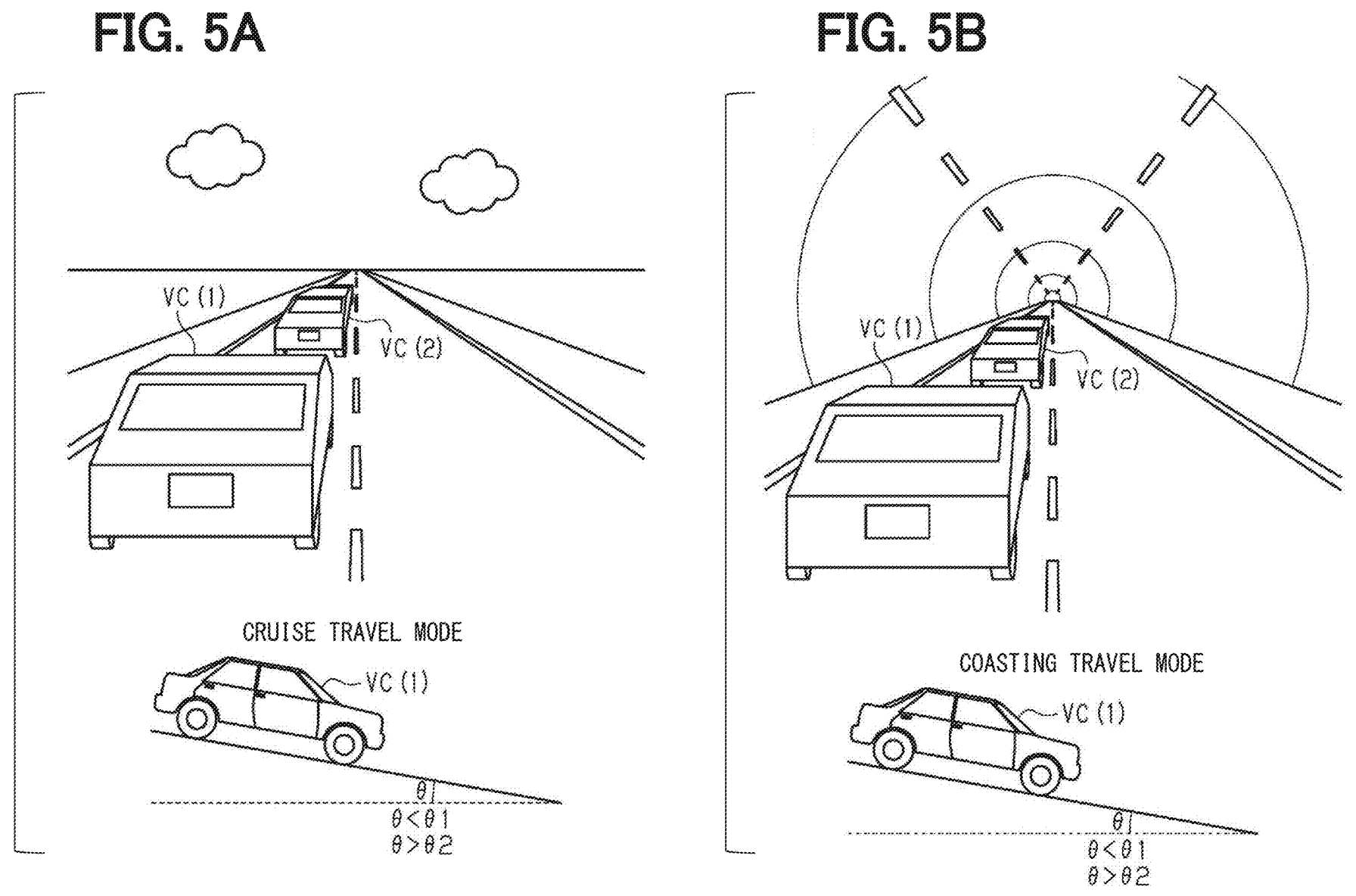

FIG. 5A shows a case where the vehicle VC is traveling outside a tunnel, while FIG. 5B shows a case where the vehicle VC is traveling inside a one-way tunnel. In FIG. 5A and FIG. 5B, each vehicle VC is identified by the number in parentheses after "VC." FIG. 5A and FIG. 5B each shows a "host vehicle VC(1)" and a "preceding vehicle VC(2)" relative to the host vehicle VC(1).

FIG. 5A shows a case where the cruise travel mode is continued outside the tunnel because the gradient θ is greater than the reference threshold value θ2. FIG. 5B shows an example in which the gradient θ inside a one-way tunnel is smaller than the tunnel threshold value θ1, and therefore the travel mode is switched to the coasting travel mode. The gradient θ shown in FIG. 5A and the gradient θ shown in FIG. 5B are the same in magnitude.

In the one-way tunnel shown in FIG. 5B, an air flow is generated in advancing travel direction. This air flow is generated by vehicles traveling through the one-way tunnel. Some one-way tunnels are also equipped with ventilation fans. If a ventilation fan is provided in the tunnel, the air flow may also be generated by the ventilation fan. This air flow acts as a tailwind when the vehicle VC is traveling. Therefore, even when the gradient θ of road surface in the tunnel is the same as that of outside the tunnel, the longitudinal acceleration of the vehicle VC due to the coasting travel process tends to be greater inside the one-way tunnel than outside the tunnel.

FIG. 5A and FIG. 5B show examples in which the preceding vehicle VC(2) is traveling ahead of the host vehicle VC(1). The CPU 32 controls the inter-vehicle time between the host vehicle and the preceding vehicle VC(2) so that the inter-vehicle time does not become excessively great. Therefore, in a situation where deceleration occurs due to the coasting travel process, the mode may not be switched from the cruise travel mode to the coasting travel mode. This situation is shown in FIG. 5A. Even with such a gradient θ, it is considered that the host vehicle VC(1) will accelerate in the one-way tunnel. Therefore, the CPU 32 switches to the coasting travel mode.

This configuration can reduce the energy consumption rate of the vehicle VC while controlling the vehicle distance and the vehicle speed SPD in a proper manner.

Second Embodiment

The second embodiment will be described below with reference to the drawings, and description of second embodiment will focus on differences from the first embodiment.

In the first embodiment, the gradient θ of road surface on which the vehicle VC is currently traveling is used as an input for determining whether to switch to the coasting travel mode. In the present embodiment, a gradient θx of road surface on which the vehicle VC is predicted to travel in the near future is used as an input for determining whether to switch to the coasting travel mode.

Figure 6:
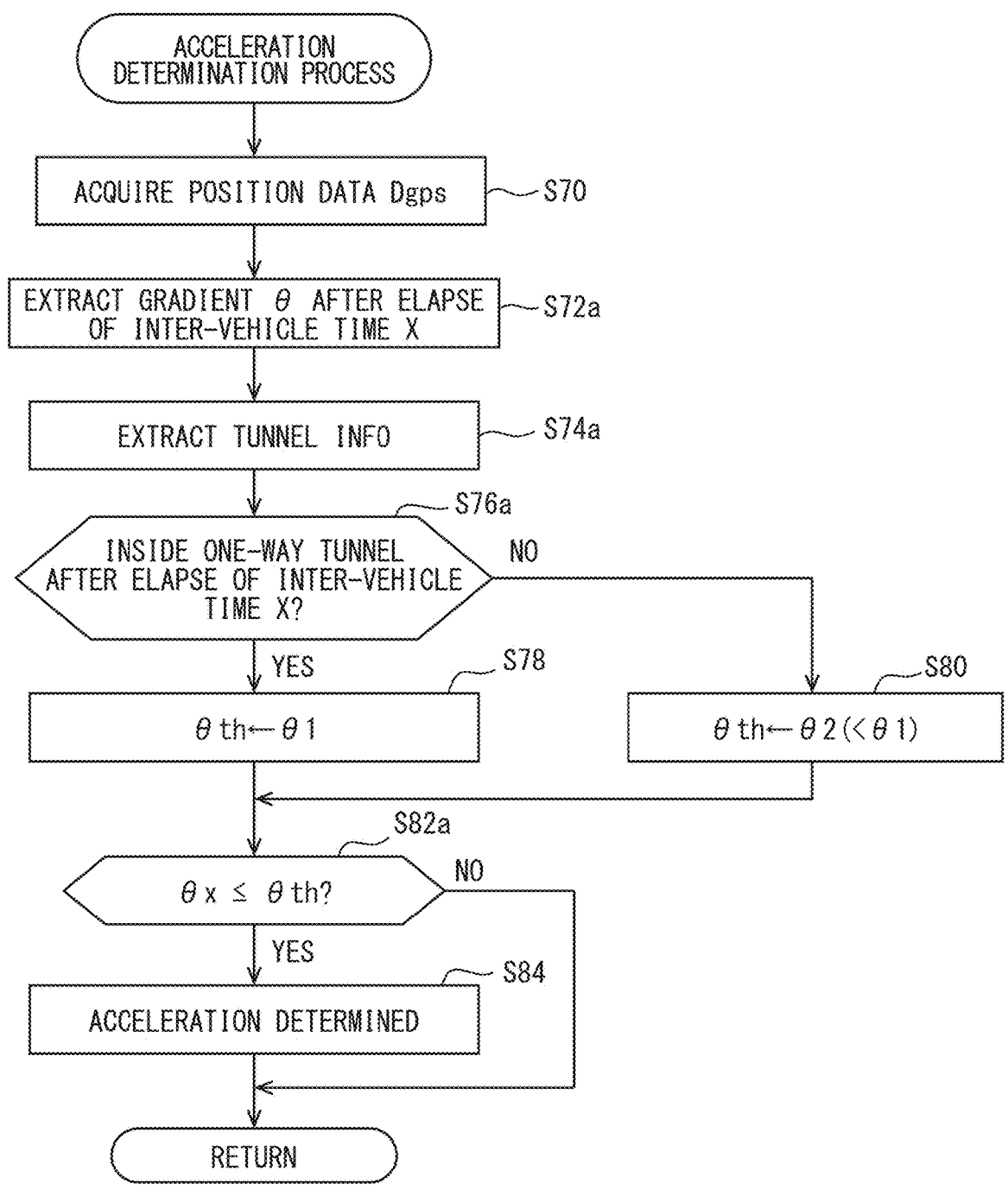
FIG. 6 is a flowchart showing a procedure of process executed by a control device according to a second embodiment.

FIG. 6 shows details of the process of S58 according to the present embodiment. In FIG. 6, the steps of process corresponding to those shown in FIG. 4 are denoted by the same step numbers and description thereof will be omitted for convenience.

In the processes shown in FIG. 6, when the CPU 32 completes S70, the CPU 32 extracts the gradient θx predicted at a time when the inter-vehicle time X has elapsed (S72a). This process can be configured as follows. The CPU 32 first specifies the position after elapse of inter-vehicle time X based on (i) the current position on the map specified based on the position data Dgps and the map data 80 and (ii) the inter-vehicle time X calculated using the vehicle speed SPD as an input. Then, the CPU 32 searches the map data 80 for data relating to the specified position, and extracts the gradient θx at that position.

Then, the CPU 32 extracts tunnel information after the inter-vehicle time X has elapsed (S74a). Then, based on the process of S74a, the CPU 32 determines whether the vehicle VC is traveling in a one-way tunnel after the inter-vehicle time X has elapsed (S76a).

When the CPU 32 makes a positive determination in the process of S76a, the process proceeds to S78. When the CPU 32 makes a negative determination in S76a, the process proceeds to S80. After completing the process of S78 or S80, the CPU 32 determines whether the gradient θx is equal to or less than the threshold value θth (S82a). When the CPU 32 determines that the gradient θx is equal to or less than the threshold value θth (S82a: YES), the CPU 32 proceeds to S84.

It should be noted that the CPU 32 completes the process of S58 when the process of S84 is completed or when a negative determination is made in the process of S82a.

In the present embodiment, the gradient θx of the position where the vehicle VC will travel in the near future is used as an input to determine whether to switch to the coasting travel mode. This configuration can increase an opportunity for executing the coasting travel process in a situation where it is proper to execute the coasting travel process.

Third Embodiment

The third embodiment will be described below with reference to the drawings, and description of third embodiment will focus on differences from the first embodiment.

Figure 7:
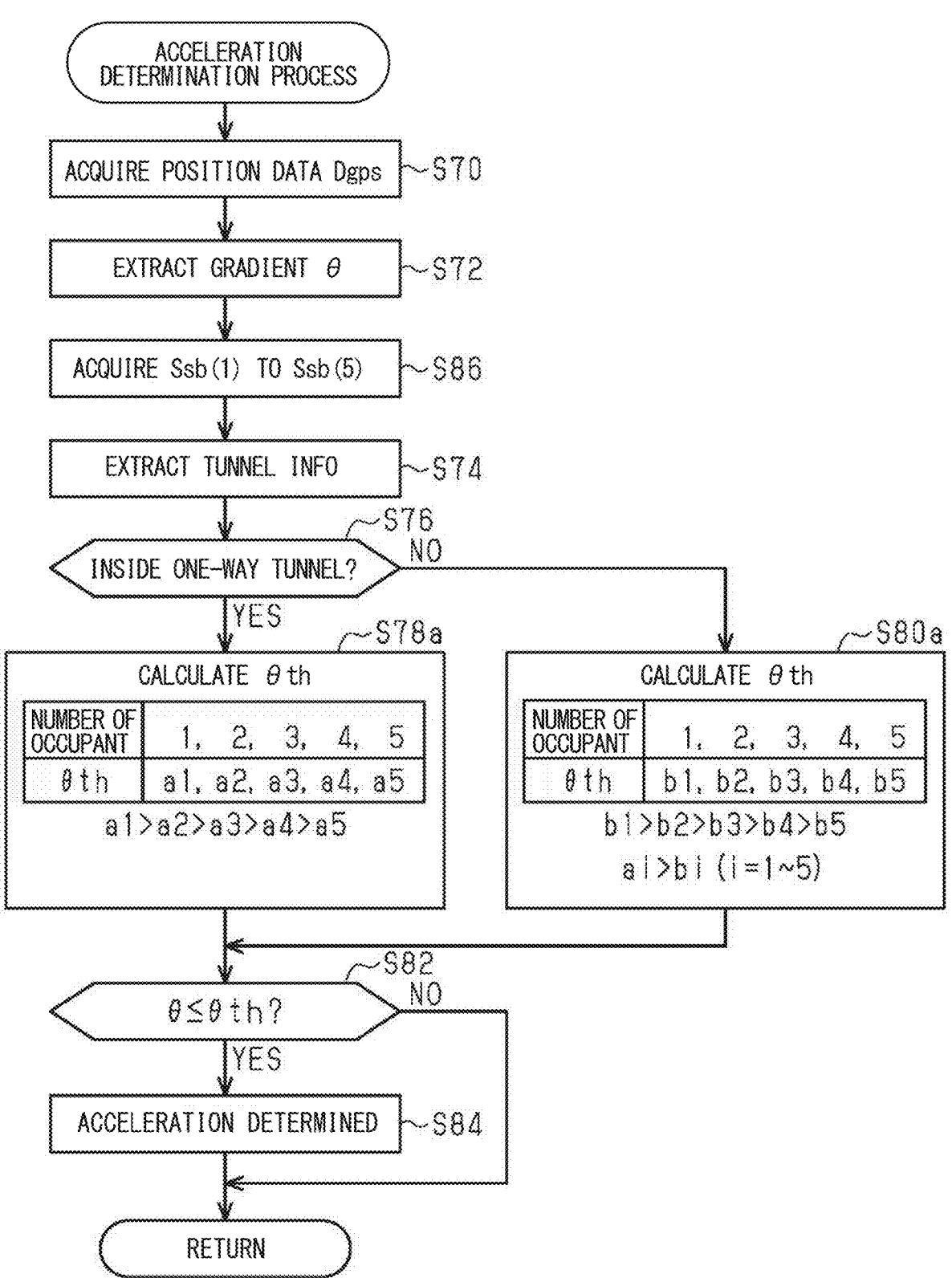
FIG. 7 is a flowchart showing the procedure of process executed by a control device according to a third embodiment.

FIG. 7 shows details of the process of S58 according to the present embodiment. In FIG. 7, the steps of process corresponding to those shown in FIG. 4 are denoted by the same step numbers and description thereof will be omitted for convenience.

In the process shown in FIG. 7, after the CPU 32 completes the process of S72, the CPU 32 acquires output signals Ssb(1) to Ssb(5) (S86). Then, the CPU 32 proceeds to the process of S74. When the CPU 32 makes a positive determination in the process of S76, the process proceeds to S78a. In the process of S78a, the CPU 32 sets the threshold value θth in accordance with the number of occupants. The CPU 32 calculates the number of occupants using the output signals Ssb(1) to Ssb(5) as inputs. The CPU 32 determines that the total weight of the occupants is lighter as the number of occupants is smaller, and calculates the threshold value θth to have a larger value. The threshold value is calculated with consideration of the fact that the smaller the total weight, the vehicle is easier to be accelerated even on a small gradient.

When the CPU 32 makes a negative determination in the process of S76, the process proceeds to S80a. In the process of S80a, the CPU 32 sets the threshold value θth in accordance with the number of occupants. The CPU 32 determines that the total weight of the occupants is lighter as the number of occupants is smaller, and calculates the threshold value θth to have a larger value. However, for the same number of occupants, the CPU 32 calculates the threshold value θth to be a smaller value in the process of S80*a* compared to the threshold value θth calculated in the process of S78*a*.

When the CPU 32 completes the process of S78*a* or S80*a*, the CPU 32 proceeds to the process of S82.

In the present embodiment, in addition to whether the vehicle is in a one-way tunnel, the number of occupants is also taken into consideration as a factor that can cause differences in the acceleration possibility of the vehicle VC even when the magnitude of the gradient θ is the same. This configuration enables a proper switch to the coasting travel mode. When the threshold value θth is set regardless of the number of occupants, the threshold value θth needs to be set to a value that ensures acceleration of the vehicle VC during the coasting travel process. Thus, it is necessary to set the threshold value θth to a value that ensures acceleration of vehicle even when the number of occupants has maximum number. This may lead to a situation where, when the number of occupants on board is less than the maximum number, the vehicle VC is not switched to the coasting travel mode even though the vehicle VC is actually accelerating due to the coasting travel process. According to the present embodiment, the frequency at which the coasting travel process is executed can be properly increased according to the actual situation.

OTHER EMBODIMENTS

The above-described embodiments may be modified as follows. The above-described embodiments and the following modifications can be implemented in combination with one another under a condition that there is no technical contradiction.

(Regarding Read-Ahead Process)

In the process of FIG. 6, the condition for setting the threshold value θth to the tunnel threshold value θ1 may include a condition that the vehicle is currently located in the one-way tunnel, in addition to the condition that the vehicle is located in the one-way tunnel after the inter-vehicle time X has elapsed.

In the process of FIG. 6, even though the gradient θx is equal to or less than the threshold value θth, if the gradient θ of road surface of current raveling lane of the vehicle is excessively large, the mode may not be switched to the coasting travel mode.

In the process of FIG. 7, the gradient θx at the time after the inter-vehicle time X has elapsed may be compared with the threshold value θth.

(Regarding Deviation Variable)

The variable indicating the weight of occupants of the vehicle VC is not limited to the variable indicating the number of occupants. For example, the weight of occupants may be the sum of weights of the occupants in the vehicle VC. For example, by registering a weight of a vehicle user in a portable terminal of the user and transmitting the registered weight information from the portable terminal to the ADAS ECU 30, the weight of occupant can be obtained. This process can be implemented by installing a dedicated purpose application software on the mobile terminal in advance. Alternatively, by analyzing in-vehicle image data output from an in-vehicle camera that captures an inside of the vehicle VC, it may be possible to estimate that the higher the seating height, the heavier the occupant's weight. In this case, the value obtained by this estimation becomes the value of the variable indicating the weight.

The variable indicating the weight of vehicle VC is not limited to a variable that has a positive correlation with the number of occupants. For example, the variable may indicate the weight of objects in a luggage room. In this case, the value of variable may be estimated, for example, using image data output by a camera that captures an image of objects existing in the luggage room. That is, for example, the weight may be estimated to be a large value in proportion to the size of captured object.

Among the deviation variables, the variable indicating the driving environment of the vehicle VC is not limited to the variable indicating whether the vehicle is traveling in a one-way tunnel. For example, the variable indicating the driving environment may be a variable indicating whether a preceding vehicle traveling within a predetermined distance ahead of the vehicle VC is a large size vehicle, such as a truck. When the preceding vehicle is a large size vehicle, the air resistance of host vehicle becomes small. Thus, the vehicle can switch to the coasting travel mode even on a smaller gradient.

(Regarding Switching Process)

The switching to the coasting travel mode based on a comparison of the magnitude between the gradient θ and the threshold value θth does not necessarily have to be based on the condition (H). For example, in addition to whether the vehicle is traveling in a one-way tunnel, instead of setting the threshold θth according to the inter-vehicle time, the logic for switching to the coasting travel mode when condition (H) is satisfied may be omitted. The threshold value θth may be set to a negative value whose absolute value increases as the inter-vehicle time increases.

In the above embodiments, when a positive determination is made in the process of S44, the travel mode is switched to the cruise travel mode. The present invention is not limited to this configuration. For example, when the gradient θ is negative and has a sufficiently large absolute value, coasting travel may be continued since the vehicle can have sufficient acceleration.

The switching process is not limited to a process of switching to the coasting travel process when the vehicle is predicted to accelerate by switching to the coasting travel process. For example, the vehicle may be switched to the coasting travel when the current vehicle speed is predicted to be maintained by switching to the coasting travel process. The switching process may be executed, for example, when the vehicle speed SPD is equal to or greater than "SPD*-β" and equal to or less than "SPD*+α".

The switching process is not limited to the process of switching to the coasting travel mode when the gradient θ, θx is equal to or smaller than the threshold value θth. For example, the switching process may be performed according to the value of a dependent variable of a function that uses the gradient θx and the deviation variable as input variables and outputs a variable value that selectively indicates either the cruise travel mode or the coasting travel mode. It should be noted that the function ensures that when the deviation variable value indicates that the vehicle is in a one-way tunnel, the dependent variable value is indicative of the coasting travel mode, even though the gradient θx is greater than when the deviation variable value indicates that the vehicle is not in a one-way tunnel.

(Regarding Travel Control Device)

In the above embodiments, the ADAS ECU 30 functioning as the travel control device receives the object recognition result, which is obtained from the LIDAR ECU 12 after the LIDAR ECU 12 performs the clustering processing or the like on the distance measurement point cloud data Drpc.

Alternatively, the ADAS ECU 30 may execute the processing, which is executed by the LIDAR ECU 12 in the above embodiments.

In the above embodiments, the ADAS ECU 30 functioning as the travel control device receives the object recognition result, which is obtained from the image ECU 22 after the image ECU 22 performs the image recognition processing on the image data Dp. Alternatively, the ADAS ECU 30 may execute the processing, which is executed by the image ECU 22 in the above embodiments.

The travel control device is not limited to the above-described configuration, which includes the CPU 32 and the storage device 34 and executes the software processing. For example, a dedicated hardware circuit, such as an ASIC may be provided to execute at least a part of the software process in the above embodiments using a hardware circuit. That is, the execution device may have any of the following configurations (a) to (c). In the configuration (a), the execution device includes a processor for executing all of the above processes according to a program and a storage device for storing the program. In the configuration (b), the execution device includes: a processor for executing a part of the above processes according to a program and a storage device; and a dedicated hardware circuit for executing the remaining part of the above processes. In the configuration (c), the execution device includes a dedicated hardware circuit for executing all of the above processes. Multiple software execution devices provided with respective processors and respective program storage devices, or multiple dedicated hardware circuits may be configured as the travel control device.

(Regarding Computer)

The computer is not limited to a single CPU 32 as shown in FIG. Further, the computer is not limited to a computer mounted on a vehicle as illustrated in FIG. 1. For example, the process in FIG. 4 may be executed by a CPU mounted on a driver's mobile terminal. In that case, a computer mounted on the vehicle and a computer not mounted on the vehicle communicate with one another and execute the travel control program 34*a* in cooperation with one another.

(Others)

In the above embodiments, an object is recognized based on the distance measurement point cloud data Drpc output from the optical sensor 10 and the image data Dpo output from the camera 20. The present disclosure is not limited to this configuration. For example, distance measurement data output from a radar device, such as a millimeter wave radar may be used or considered in the object recognition. However, it is not essential to use sensor fusion, which performs object recognition based on detection values from multiple sensors.

Although the present disclosure has been described according to the embodiments, it is understood that the present disclosure is not limited to the above-described embodiments or structures. The present disclosure includes various modification examples and equivalents thereof. In addition, while the various elements are shown in various combinations and configurations, which are exemplary, other combinations and configurations, including more, less or only a single element, are also within the spirit and scope of the present disclosure.

In the present disclosure, the term "at least one of A and B" should be understood as "only A, only B, or both A and B".

What is claimed is:

1. A travel control device comprising:
    a computer; and a non-transitory storage device,
    wherein
    the computer, by executing a control program stored in the non-transitory storage device, is configured to execute:
        a coasting travel process;
        a cruise travel process;
        a gradient information acquisition process;
        a deviation variable acquisition process; and
        a switching process,
    the coasting travel process performs a coasting travel of a vehicle,
    the cruise travel process controls a speed of the vehicle to a set vehicle speed while giving a priority to satisfaction of a predetermined condition,
    the predetermined condition is a condition for maintaining a distance to a preceding vehicle within a predetermined distance range when the preceding vehicle is located within a predetermined range ahead of the vehicle,
    the gradient information acquisition process acquires, as gradient information, information indicating a gradient of a road surface on which the vehicle is traveling,
    the deviation variable acquisition process acquires, separately from the gradient information, a deviation variable for determining an acceleration generated in the vehicle when the vehicle travels, by performing the coasting travel process, a downward slope having a predetermined gradient,
    the switching process uses the gradient information and the deviation variable as inputs and performs switching to the coasting travel process when the vehicle travels the downward slope while the cruise travel process is being executed, the switching process performs switching to the coasting travel process according to a value of the deviation variable even though a magnitude of the gradient of the road surface is smaller than a reference value,
    the deviation variable includes a variable indicating whether the vehicle is traveling in a one-way tunnel, and
    the switching process performs switching to the coasting travel process when the deviation variable indicates that the vehicle is traveling in the one-way tunnel, even though the magnitude of the gradient of the road surface is smaller than the reference value set for a traveling outside the one-way tunnel.

2. The travel control device according to claim 1, wherein the switching process accelerates the vehicle by executing the coasting travel process.

3. The travel control device according to claim 1, wherein the switching process performs switching to the coasting travel process when the vehicle travels the downward slope using the gradient information of the road surface on which the vehicle is predicted to travel after the vehicle advances a predetermined distance as an input.

4. The travel control device according to claim 1, wherein the deviation variable includes a variable indicating one or more weights of one or more occupants of the vehicle, and the switching process performs switching to the coasting travel process when a number of the one or more occupants is smaller than a reference number, even though the magnitude of the gradient of the road surface is smaller than a reference value set for the reference number of the one or more occupants.

5. A travel control method comprising steps for executing the processes described in claim 1.

6. A non-transitory storage medium storing a travel control program, the travel control program comprising instructions for executing, using a computer, the processes described in claim 1.

\* \* \* \* \*